(12) United States Patent
Takeshima et al.

(10) Patent No.: US 6,252,983 B1
(45) Date of Patent: Jun. 26, 2001

(54) HISTOGRAM GENERATOR

(75) Inventors: Masahiro Takeshima, Takatsuki; Atsuhisa Kageyama, Ibaraki; Minoru Kawabata, Takatsuki; Hiroko Sugimoto, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/034,984

(22) Filed: Mar. 4, 1998

(30) Foreign Application Priority Data

Mar. 6, 1997 (JP) .................................................. 9-051341

(51) Int. Cl.[7] ...................................................... G06K 9/00
(52) U.S. Cl. ................................................................. 382/168
(58) Field of Search ..................................... 382/168, 169, 382/270, 260, 261; 348/672, 674

(56) References Cited

U.S. PATENT DOCUMENTS 5,594,807 * 1/1997 Liu ........................................ 382/128
5,808,697 * 9/1998 Fujimura et al. ...................... 348/672

FOREIGN PATENT DOCUMENTS

| 0488542 A1 | 6/1992 | (EP) . |
| 0516084 A2 | 12/1992 | (EP) . |
| 0548781 A2 | 6/1993 | (EP) . |
| 0548781 A3 | 6/1993 | (EP) . |
| 0654942 A1 | 5/1995 | (EP) . |
| 62-51551 | 10/1987 | (JP) . |
| 62-297980 | 12/1987 | (JP) . |
| 01081077 | 2/1989 | (JP) . |
| 01082276 | 3/1989 | (JP) . |
| 01082288 | 3/1989 | (JP) . |

* cited by examiner

Primary Examiner—Phuoc Tran
(74) Attorney, Agent, or Firm—Ratner & Prestia

(57) ABSTRACT

A histogram generator creates a histogram to detect the characteristics of video signals. The histogram generator allows for a reduction in problems of instability caused by noise that may exist in other histogram generators. A width is allocated to thresholds used in creating the histogram, and signal values are counted after weighting those falling near a threshold.

7 Claims, 17 Drawing Sheets

HISTOGRAM GENERATOR

FIELD OF THE INVENTION

The present invention relates to the field of histogram generators, and particularly to the detection of distribution of levels of input data such as input video signals.

BACKGROUND OF THE INVENTION

In general, histograms are created in a signal processing circuit for television signals to extract the characteristics of video signals. Applied technology for creating histograms has been introduced in the past. One example of a device employing such technology is disclosed in Japanese Laid-open Patent No. S58-63989.

FIG. 17 shows an example of a histogram which divides sampled input signals into more than one group based on the size of sample value. In FIG. 17, sampled signals are divided into four groups. In order to group the sample values, thresholds a1, a2, and a3 are set, and four intervals, S1, S2, S3 and S4 are then formed in accordance with these thresholds. Continuous input video signals are sampled and sample values allocated to one of the intervals S1, S2, S3, and S4. A histogram is created based on the intervals S1, S2, S3, and S4, and the counted number of samples (frequency) allocated to each intervals.

In a histogram generator such as the one of the aforementioned patents, however, the created histogram may be unstable. A sample value of the input signal that lies in small neighborhood of the threshold a1 may be judged by the histogram generator as belonging to the interval S1 at one moment while judged as belonging to the interval S2 at another moment, due to factors like noise.

SUMMARY OF THE INVENTION

A histogram generating apparatus according to the present invention finds a frequency of an input video signal level by dividing a maximum range of the input signal level into several intervals using several threshold values as boundaries. The histogram generating apparatus comprises a weighting circuit for weighting samples occurring near a threshold value and a counting circuit for counting the output signals of the weighting circuit.

DESCRIPTION OF THE PREFERRED EMBODIMENT

Assume that a lower threshold value (a first threshold) is denoted A and a upper threshold value (a second threshold) is denoted B to form an interval between A and B. In the conventional histogram generator (see FIG. 16) a histogram is obtained by classifying input video signals according to whether an input video signal S belongs to an interval or not, where the interval is defined by the threshold values A and B. According to the present invention, on the other hand, a histogram generating apparatus sets a threshold width W at both sides of the interval lying between threshold values A and B. Thus allowing both threshold values A and B to have a slope associated with them within a margin of ±W as drawn with a solid line in FIG. 16; whereby a weighting function is produced. The weighting function weighs the data, which are then counted to produce a histogram.

In other words, when a level of the input video signal S is near the center of a weighting function associated with A or B, the weighted data is unchanged, and when the level of the input video signal S is near the threshold value A or B, the weighted data takes a value proportional to the distance from the center.

Figure 16:
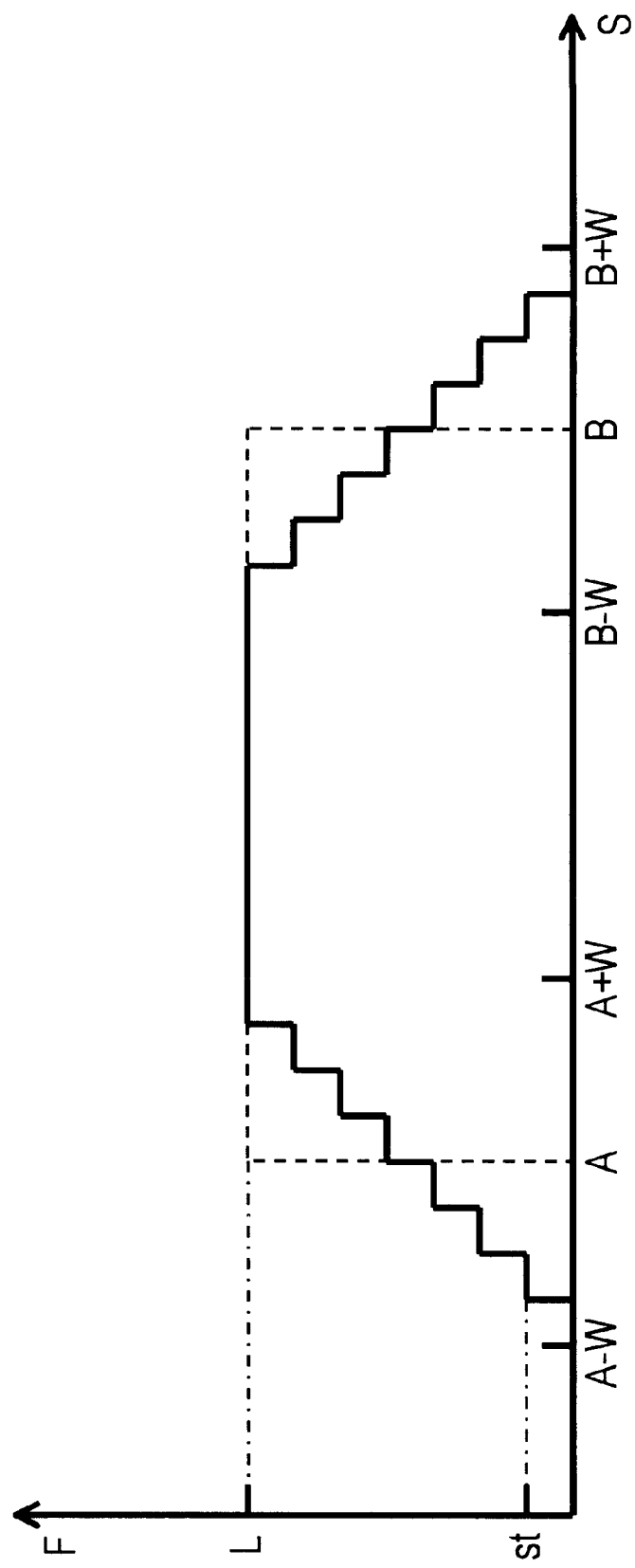
FIG. 16 shows a weighting function for generating a histogram in the exemplary embodiment of the present invention.
Figure 17:
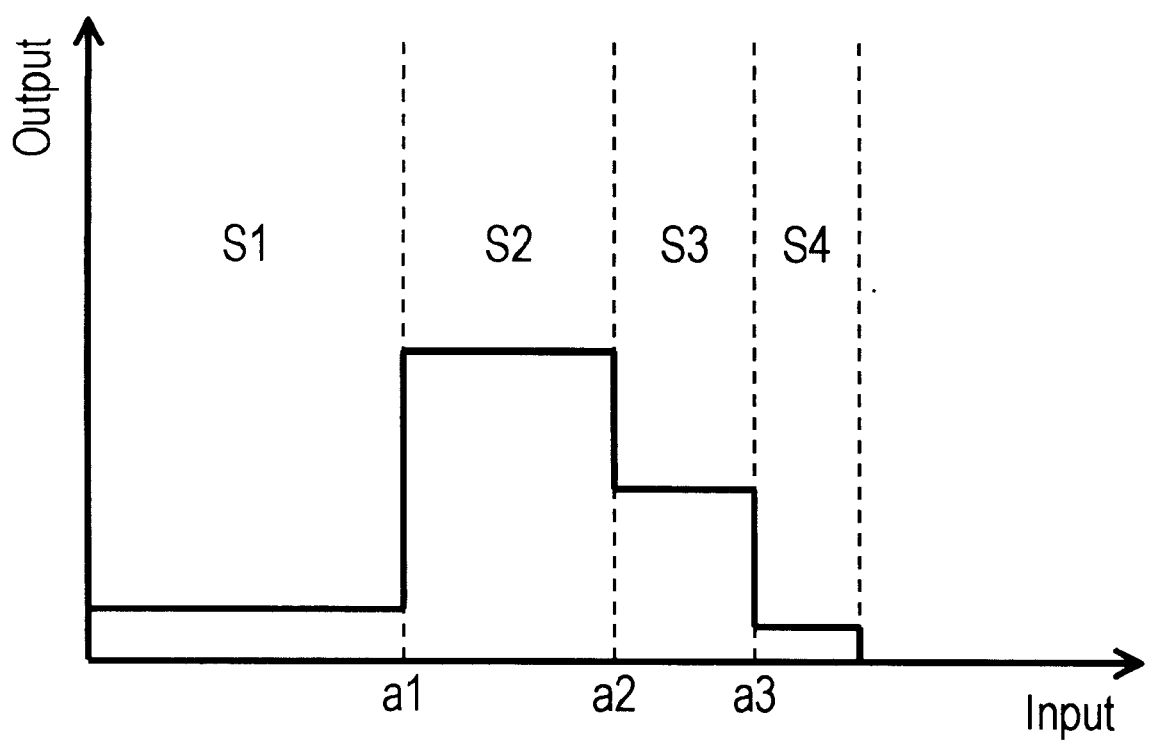
FIG. 17 is a histogram created using the prior aft.

In FIG. 16, steps drawn with a solid line within the ranges of ±W as the apparatus handles digital data. When analog data is handled, or the number of bits is increased in digital data, the steps (FIG. 16) closely approximate a line. In the lower neighborhood of the threshold A, the corresponding interval covering (A−W) to A has the same width as that of the upper neighborhood interval covering A to (A+W). Therefore, if the neighborhood of the threshold B is similarly arranged, the frequency can be calculated by using the weighting function, and the counted frequencies integrated to produce the desired histogram.

In the following description, one of a plurality of intervals of the histogram is described. This interval has a first threshold value A as well as a second threshold value B (A<B) associated with it.

First Exemplary Embodiment

Figure 1:
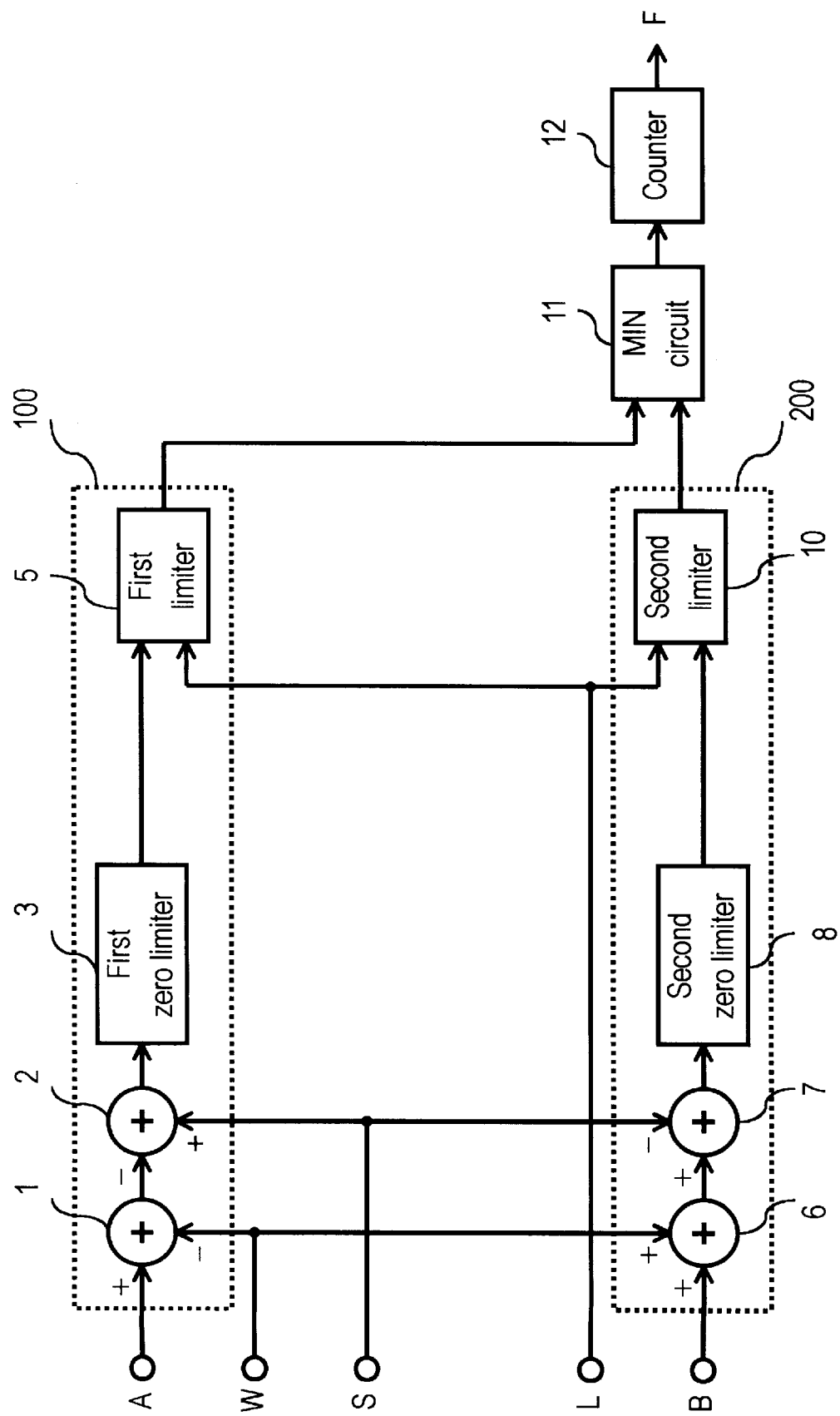
FIG. 1 is a block diagram of a histogram generator in accordance with a first exemplary embodiment of the present invention.

FIG. 1 shows a block diagram of a histogram generator for creating a histogram of video signals in a first exemplary embodiment of the present invention.

The histogram generator of the first exemplary embodiment comprises a first weighting circuit 100, a second weighting circuit 200, minimum detector circuit (MIN circuit) 11, and a counter 12. The histogram generator for video signals as configured in FIG. 1 receives input video signal S and outputs sample number (frequency) F of the input video signal S. The input video signal S is, for example, a luminance signal.

The configuration and operation of the first weighting circuit 100 is explained first.

The first subtractor 1 subtracts a threshold width W which is set externally and is provided to allocate width associated with to the first threshold A which is also set externally. The subtracted value (A−W) is outputted to the second subtractor 2.

The second subtractor 2 subtracts the output of the first subtractor 1 from an input video signal S, and outputs the subtracted value (S−(A−W)) to the first zero limiter 3.

The first zero limiter 3 outputs i) 0 if the output of the second subtractor 2 is zero or a negative value, or ii) the output value of the second subtractor 2 if the output of the second subtractor 2 is a positive value. In other words, the first zero limiter 3 outputs 0 or (S−(A−W)) in response to the input video signal S.

Figure 11A:
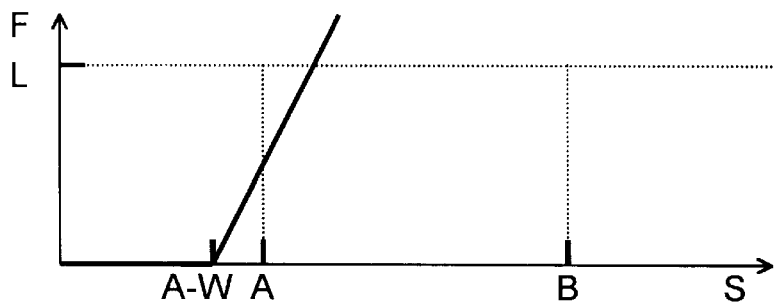
FIGS. 11A–E shows an order of creating a weighting function used for generating a histogram in the exemplary embodiments of the present invention.

According to the above operation the weighting function associated with the threshold A that results is shown in FIG. 11A. In FIGS. 11A–E, the level of the input video signal S is plotted along the abscissa, and the magnitude of weighted data determined by a weighting function is plotted along the ordinate F. In FIGS. 11A–E, the weighting function in a neighborhood of the threshold is shown by a slanted line but it is a step shaped if digital data is handled.

The first limiter 5 receives the output of the first zero limiter 3 and a limit level L which is set externally, and outputs i) the output of the first zero limiter 3 if the output of the first zero limiter 3 is smaller than the limit level L, or ii) the limit level L if the output of the first zero limiter 3 is greater than or equal to the limit level L. In other words, the first limiter 5 outputs 0, (S−(A−W)), or L in response to the input video signal S. In the present exemplary embodiment L is equal to 2W.

Figure 11B:
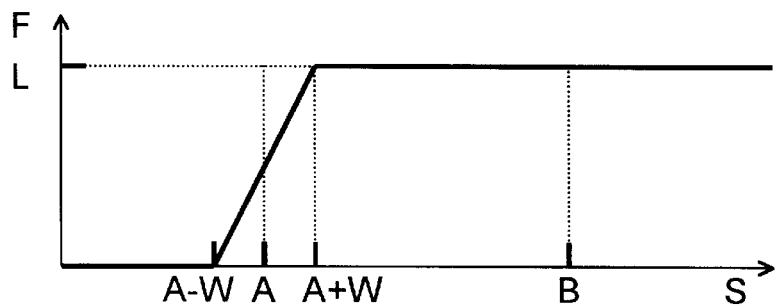

According to the above operation the first weighting circuit 100 outputs the weighted data values near the threshold A limited by the limit level L as shown in FIG. 11B. In FIGS. 11A–E, the limit level L is shown along the ordinate.

The configuration and operation of the second weighting circuit 200 is explained next.

The first adder 6 adds a second threshold B which is set externally and the threshold width W, and outputs the added value (B+W) to the third subtractor 7.

The third subtractor 7 subtracts the input video signal S from the output of the first adder 6, and outputs the subtracted value (B+W−S) to the second zero limiter 8.

The second zero limiter 8 outputs i) the output value (B+W−S) of the third subtractor 7 if the output (B+W−S) of the third subtractor 7 is a positive value, or ii) 0 if the output value (B+W−S) of the third subtractor 7 is 0 or a negative value.

Figure 11C:
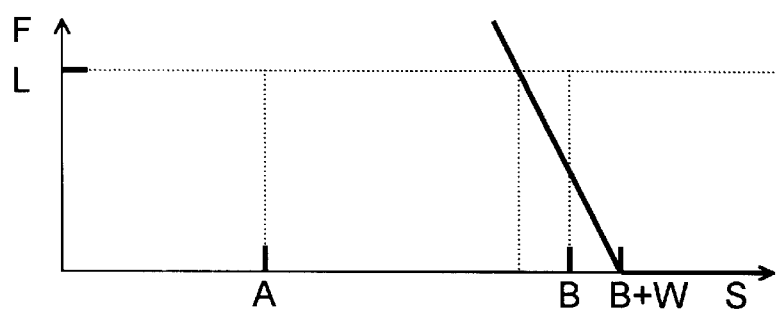

According to the above operation weighting function associated with data near the threshold B is as shown in FIG. 11C.

The second limiter 10 receives the output of the second zero limiter 8 and the limit level L, and outputs i) the output of the second zero limiter 8 if the output of the second zero limiter 8 is smaller than the limit level L, or ii) the limit level L if the output of the second zero limiter 8 is greater than or equal to the limit level L.

Figure 11D:
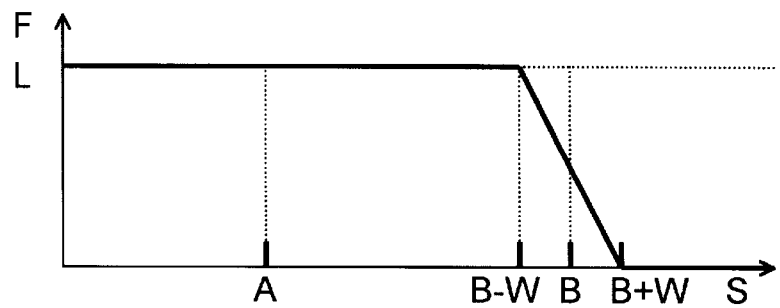

According to the above operation the second weighting circuit 200 outputs the weighted data values near the threshold B limited by the limit level L as shown in FIG. 11D.

The minimum detector circuit (MIN circuit) 11 receives the output of the first limiter 5 and the output of the second limiter 10, and outputs the smaller.

Figure 11E:
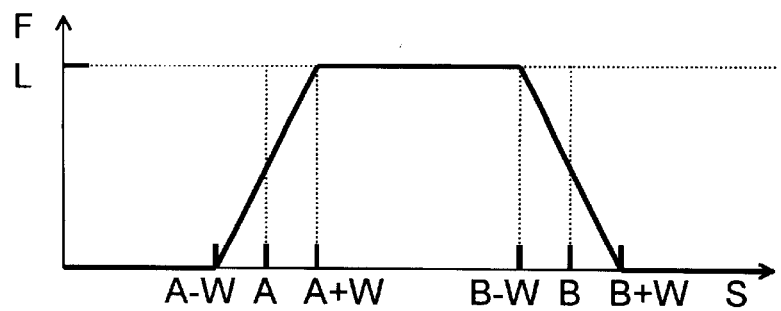

According to the operation described above a trapezoidal weighting function is realized as shown in a solid line in FIG. 11E.

The counter 12 cumulatively adds the output signal of the minimum detector circuit 11.

According to the above operation for a one frame or a one field video signal a histogram of video signals using a trapezoidal weighting function, shown in FIG. 11E, is generated.

A histogram generator of the present invention counts data with weighting function that increases within the threshold width near the first threshold, decreases within the threshold width near the second threshold, by allocating width near the second thresholds, and is constant near the center between the thresholds.

Accordingly, the first exemplary embodiment enables the creation of stable histogram by allocating width to thresholds and utilizing weighting function near the thresholds. The histogram, in turn, is used for extracting the characteristics of video signals.

Second Exemplary Embodiment

Figure 2:
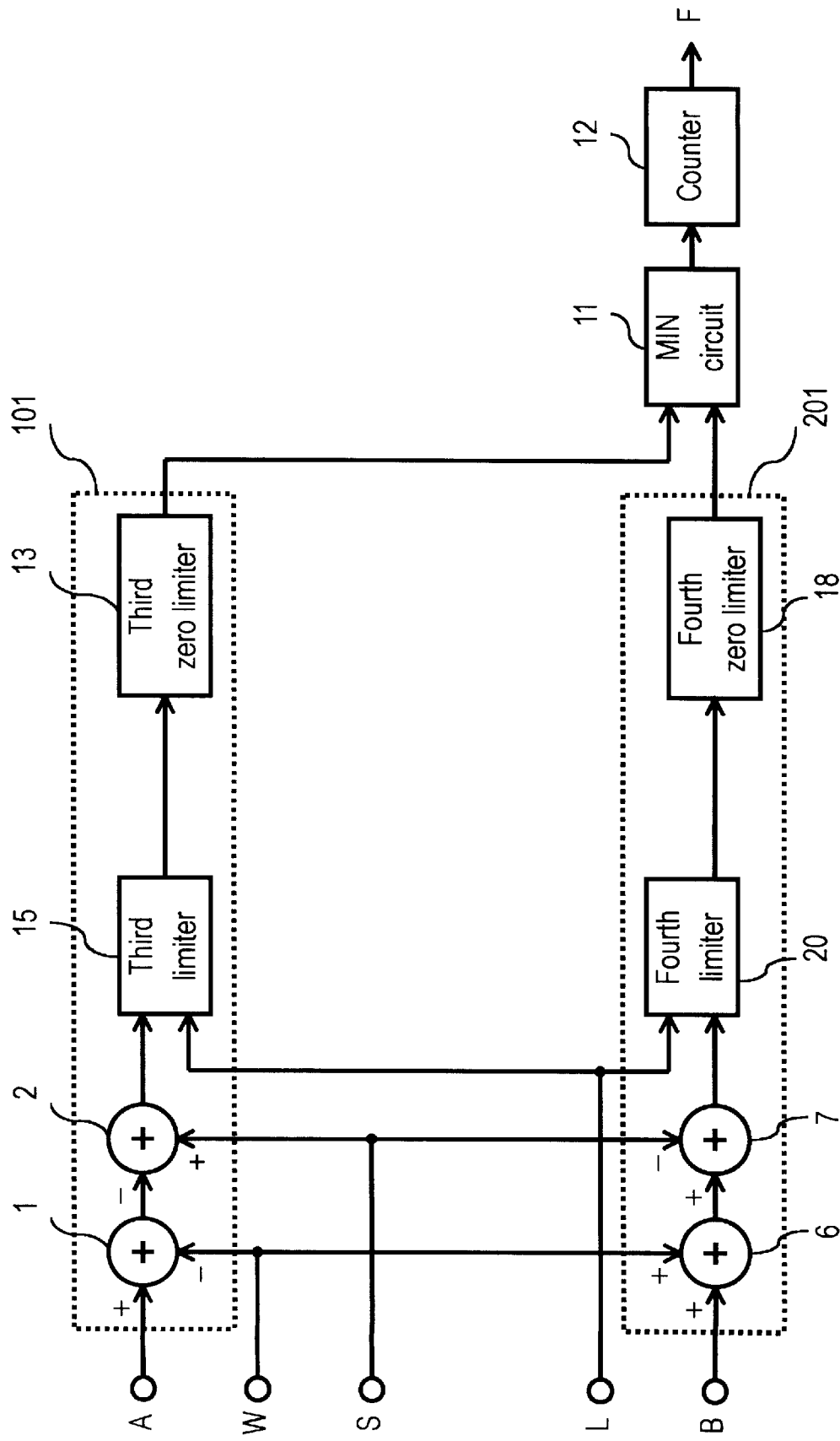
FIG. 2 is a block diagram of a histogram generator in accordance with a second exemplary embodiment of the present invention.

FIG. 2 shows a configuration of a histogram generator for video signals in a second exemplary embodiment of the present invention. The configurations and operations of the components in FIG. 2 with the same reference numeral as in the first exemplary embodiment (FIG. 1) are the same as in the first exemplary embodiment, and thus their explanation is omitted.

The configuration and operation of the first weighting circuit 101 is explained first.

The configurations and operations of the first subtractor 1 and the second subtractor 2 are the same as in the first exemplary embodiment, and thus their explanation is omitted.

The third limiter 15 receives the output value (S−(A−W)) of the second subtractor 2 and a limit level L which is set externally, and outputs i) the output of the second subtractor 2 if the output of the second subtractor 2 is smaller than the limit level L, or ii) the limit level L if the output of the second subtractor 2 is greater than or equal to the limit level L.

Figure 12A:
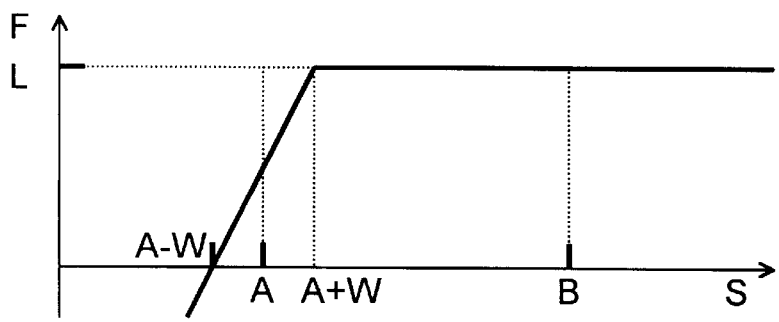
FIGS. 12A–E shows an order of creating a weighting function used for generating a histogram in the exemplary embodiments of the present invention.

According to the above operation the output value of the third limiter 15 is shown in FIG. 12A.

The third zero limiter 13 outputs i) 0 if the output of the third limiter 15 is zero or a negative value, or ii) the output of the third limiter 15 if the output of the third limiter 15 is a positive value.

Figure 12B:
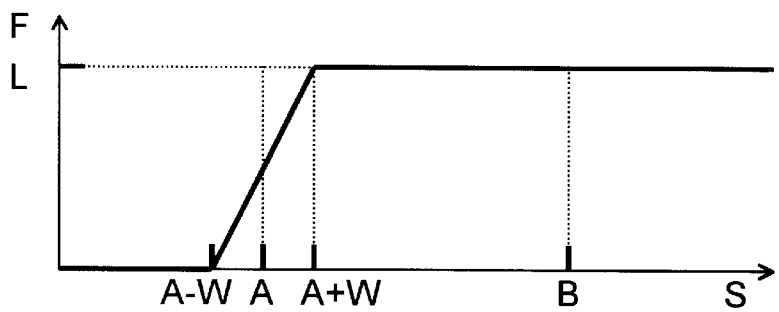

According to the above operation the first weighting circuit 101 outputs the weighted data values near the threshold A and limited by the limit level L as shown in FIG. 12B.

The configuration and operation of the second weighting circuit 201 is explained next.

The configurations and operations of the first adder 6 and the third subtractor 7 are the same as in the first exemplary embodiment, and thus their explanation is omitted.

The fourth limiter 20 receives the output value (B+W−S) of the third subtractor 7 and the limit level L, and outputs i) the output of the third subtractor 7 if the output of the third subtractor 7 is smaller than the limit level L, or ii) the limit level L if the output of the third subtractor 7 is greater than or equal, to, the limit level L. In the present exemplary embodiment L is equal to 2W.

Figure 12C:
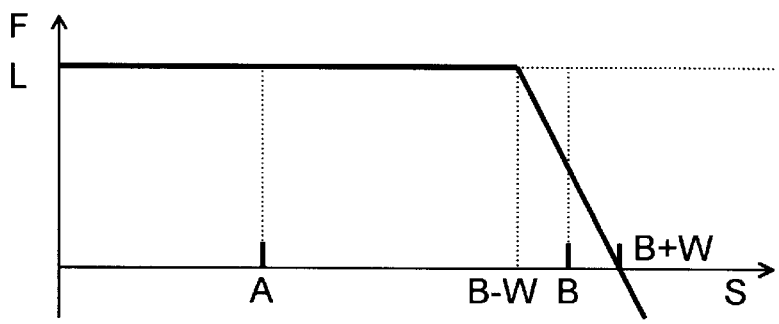

According to the above operation the output value of the fourth limiter 20 is shown in FIG. 12C.

The fourth zero limiter 18 outputs i) 0 if the output of the fourth limiter 20 is zero or a negative value, or ii) the output of the fourth limiter 20 if the output of the fourth limiter 20 is a positive value.

Figure 12D:
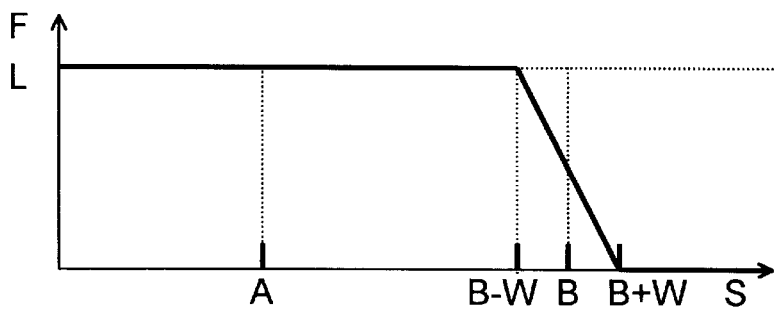

According to the above operation the second weighting circuit 201 outputs the weighted data values as shown in FIG. 12D.

The minimum detector circuit 11 receives the output of the first weighting circuit 101 and the second weighting circuit 201, and outputs the smaller.

The counter 12 cumulatively adds the output signal of the minimum detector circuit 11.

Figure 12E:
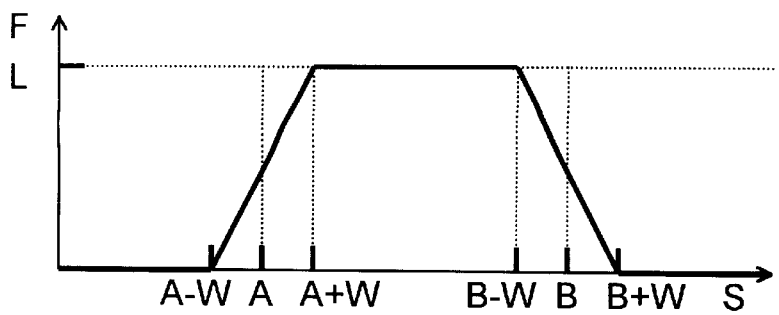

According to the above operation a histogram based on value weighted by a trapezoid weighting function, shown in FIG. 12E, is generated.

Third Exemplary Embodiment

Figure 3:
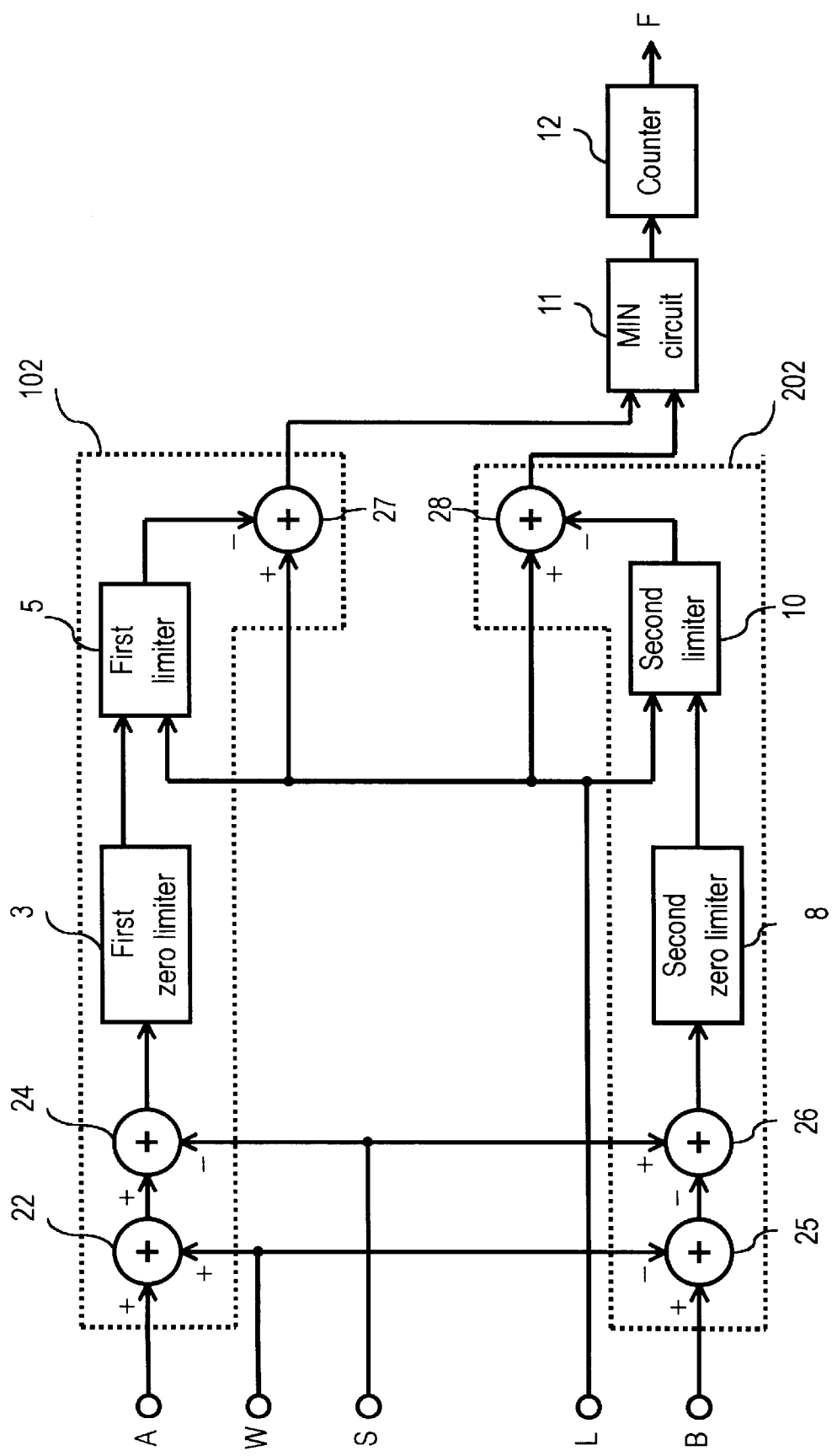
FIG. 3 is a block diagram of a histogram generator in accordance with a third exemplary embodiment of the present invention.

FIG. 3 shows a block diagram of a histogram generator for creating a histogram of video signals in a third exemplary embodiment of the present invention.

The configuration and operation of the first weighting circuit 102 is explained first.

The second adder 22 adds a first threshold A and a threshold width W. The added value (A+W) is outputted to the fourth subtractor 24.

The fourth subtractor 24 subtracts an input video signal S from the output of the second adder 22, and outputs the subtracted value (A+W−S) to the first zero limiter 3.

Figure 13A:
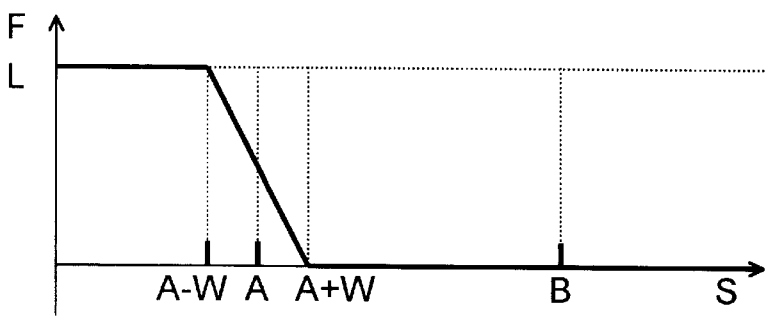
FIGS. 13A–E shows an order of creating a weighting function used for generating a histogram in the exemplary embodiments of the present invention.

The first zero limiter 3 functions as in the first exemplary embodiment, and outputs the calculated value to the first limiter 5. The first limiter 5 functions as in the first exemplary embodiment, and outputs the calculated value as shown in FIG. 13A to the seventh subtractor 27.

Figure 13B:
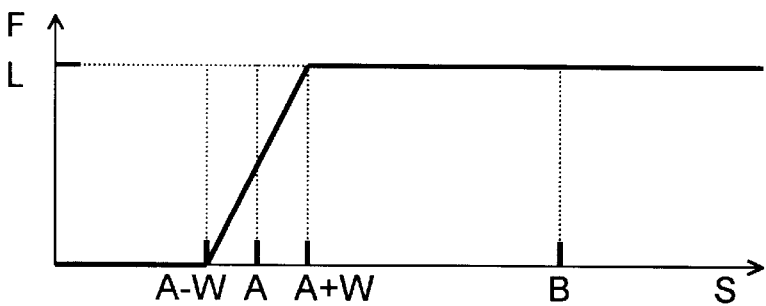

According to the above operation the output of the first weighting circuit 102 is as in FIG. 13B.

The configuration and operation of the second weighting circuit 202 is explained next.

The fifth subtractor 25 subtracts the threshold width W from the second threshold B, and outputs the subtracted value (B−W) to the sixth subtractor 26.

The sixth subtractor 26 subtracts the output of the fifth subtractor 25 from the input video signal S, and outputs the subtracted value (S−(B−W)) to the second zero limiter 8.

Figure 13C:
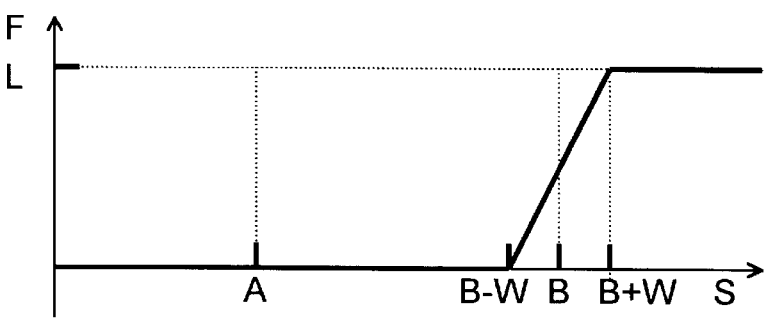

The second zero limiter 8 functions as in the first exemplary embodiment, and outputs the calculated results to the second limiter 10. The second limiter 10 functions as in the first exemplary embodiment, and outputs the calculated value as shown in FIG. 13C to the eighth subtractor 28.

The eighth subtractor 28 subtracts the output of the second limiter 10 from the limit level L. In the present exemplary embodiment L is equal to 2W.

Figure 13D:
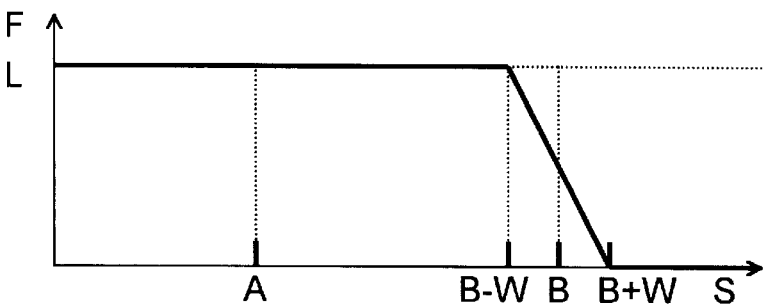

According to the above operation the output of the second weighting circuit 202 is shown in FIG. 13D.

The minimum detector circuit 11 receives the output of the first weighting circuit 102 and the second weighting circuit 202, and outputs the smaller. The counter 12 cumulatively adds the output signal of the minimum detector circuit 11.

Figure 13E:
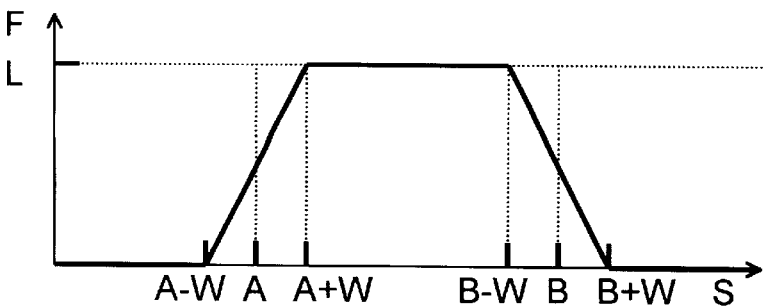

According to the above operation a histogram based on value weighted by a trapezoidal weighting function, shown in FIG. 13E, is generated.

Fourth Exemplary Embodiment

Figure 4:
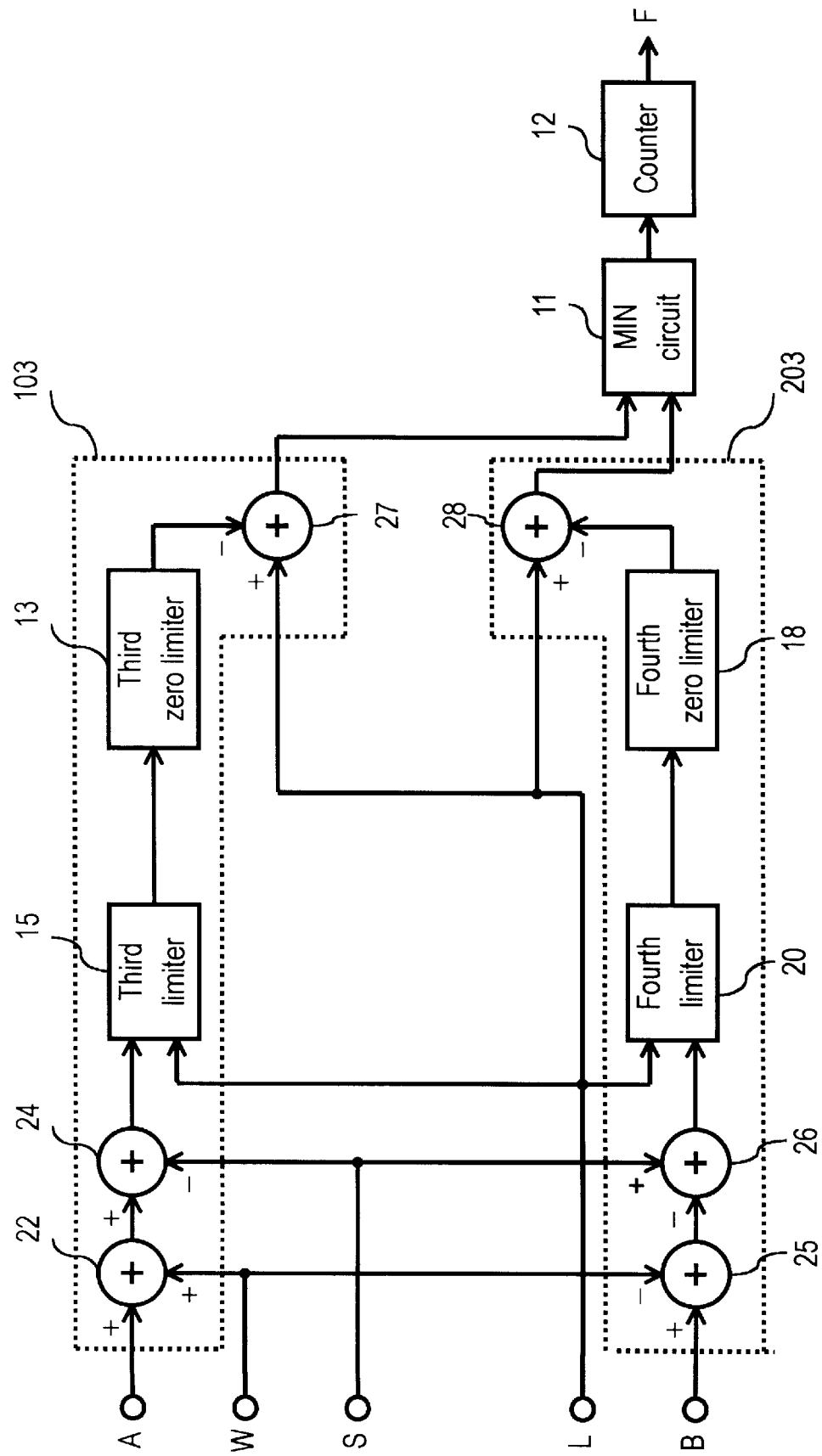
FIG. 4 is a block diagram of a histogram generator in accordance with a fourth exemplary embodiment of the present invention.

FIG. 4 shows a block diagram of a histogram generator for creating a histogram of video signals in a fourth exemplary embodiment of the present invention. The configurations and operations of the components in FIG. 4 with the same reference numerals as those in the second and third exemplary embodiments (FIG. 2 and FIG. 3) are the same as in the second and third exemplary embodiments, and thus their explanation is omitted.

The configuration and operation of the first weighting circuit 103 is explained first.

The configuration and operation of the second adder 22 and the fourth adder 24 are the same as in the 3rd exemplary embodiment (FIG. 3), and the configuration and operation of the third limiter 15 and the third zero limiter 13 are the same as in the second exemplary embodiment (FIG. 2).

The third limiter 15 received the output of the fourth subtractor 24 and a limit level L, and outputs the calculated value to the third zero limiter 13. According to the above operation an output as shown in FIG. 13A is obtained. The seventh subtractor 27 subtracts the output of the third zero limiter 13 from the limit level L.

According to the above operation the output of the first weighting circuit 103 is shown in FIG. 13B.

The configuration and operation of the second weighting circuit 203 is explained next.

The configuration and operation of the fifth subtractor 25 and sixth subtractor 26 are the same as in the third exemplary embodiments (FIG. 3), and the configuration and operation of the fourth limiter 20 and the fourth zero limiter 18 are the same as in the second exemplary embodiment (FIG. 2).

The fourth limiter 20 receives the output value (S−(B−W)) of the sixth subtractor 26 and outputs the calculated value to the fourth zero limiter 18. According to the above operation the output value obtained is shown in FIG. 13C.

The eighth subtractor 28 subtracts the output of the fourth zero limiter 18 from the limit level L. According to the above operation the output value of the second weighting circuit 203 obtained is shown in FIG. 13D. In the present exemplary embodiment L is equal to 2W.

The minimum detector circuit 11 receives the output of the first weighting circuit 103 and the second weighting circuit 203, and outputs the smaller. The counter 12 cumulatively adds the output signal of the minimum detector circuit 11.

According to the above operation a histogram based on value weighted by a trapezoidal weighting function, shown in FIG. 13E, is generated.

In the above explanation four types of weighing circuits associated with the lower threshold value A and four types of weighing circuits associated with the upper threshold value B were described in the first to fourth exemplary embodiments in FIG. 1 to FIG. 4. It is possible, however, to combine any one of the weighing circuits associated with the lower threshold value A in FIGS. 1 to 4, for example circuit 100, with any one of the weighing circuits associated with the upper threshold value B in FIGS. 1 to 4, for example circuit 201.

Fifth Exemplary Embodiment

Figure 5:
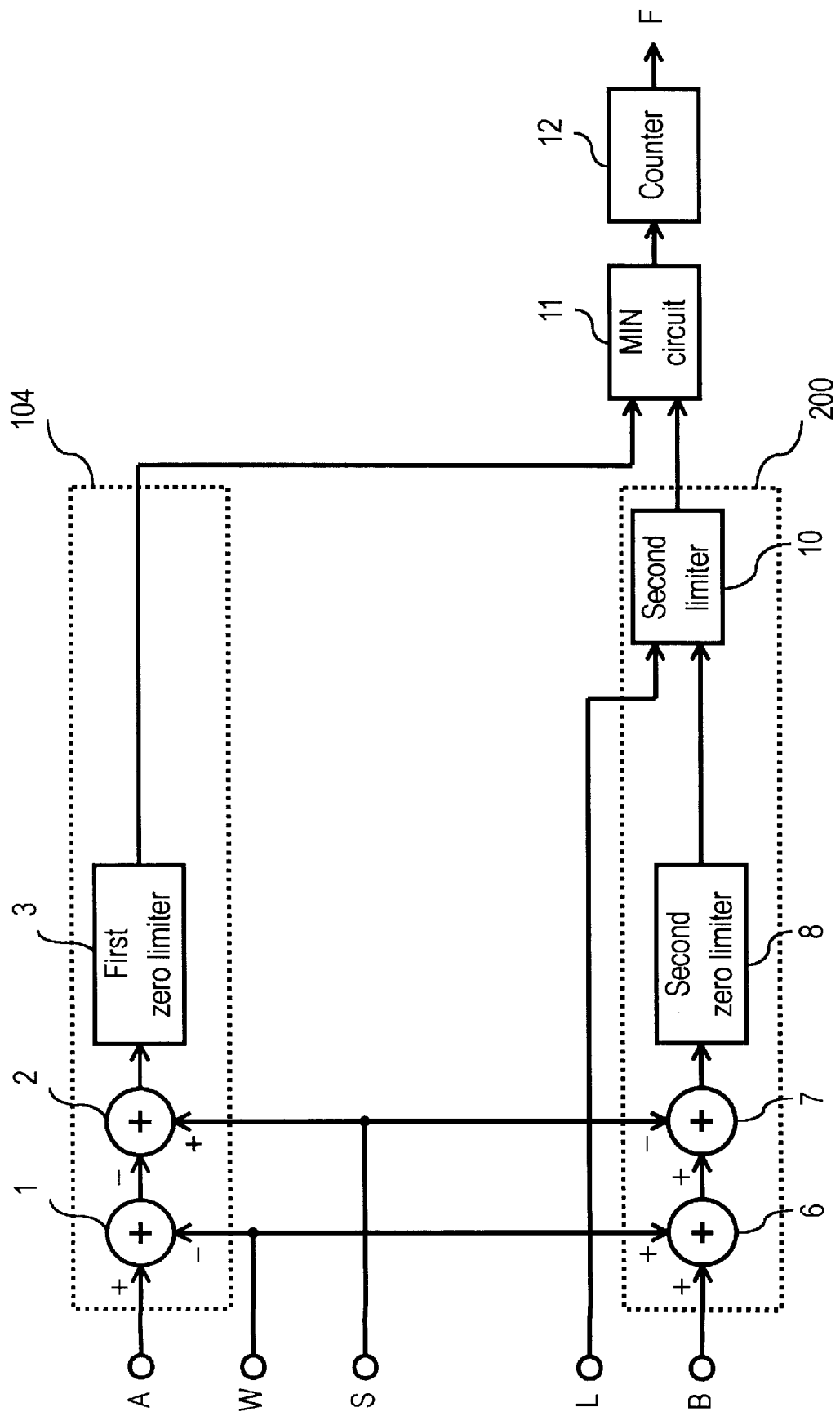
FIG. 5 is a block diagram of a histogram generator in accordance with a fifth exemplary embodiment of the present invention.

FIG. 5 shows a configuration of a histogram generator for video signals in a fifth exemplary embodiment of the present invention. A difference with the first exemplary embodiment (FIG. 1) is that the first limiter 5 is not connected, and the output of the first zero limiter 3 is directly connected to the minimum detector 11. The configurations and operations of the other components are the same as in the first exemplary embodiment, and thus their explanation is omitted.

The output produced by the operation of the first weighting circuit 104 is shown in FIG. 11A.

The output produced by the operation of the second weighting circuit 200 is shown in FIG. 11D. In the present exemplary embodiment L is equal to 2W.

The minimum detector circuit 11 receives the output of the first weighting circuit 104 and the second weighting circuit 200, and outputs the smaller. The counter 12 cumulatively adds the output signal of the minimum detector circuit 11.

According to the above operation a histogram based on value weighted by a trapezoidal weighting function, shown in FIG. 11E, is generated.

Sixth Exemplary Embodiment

Figure 6:
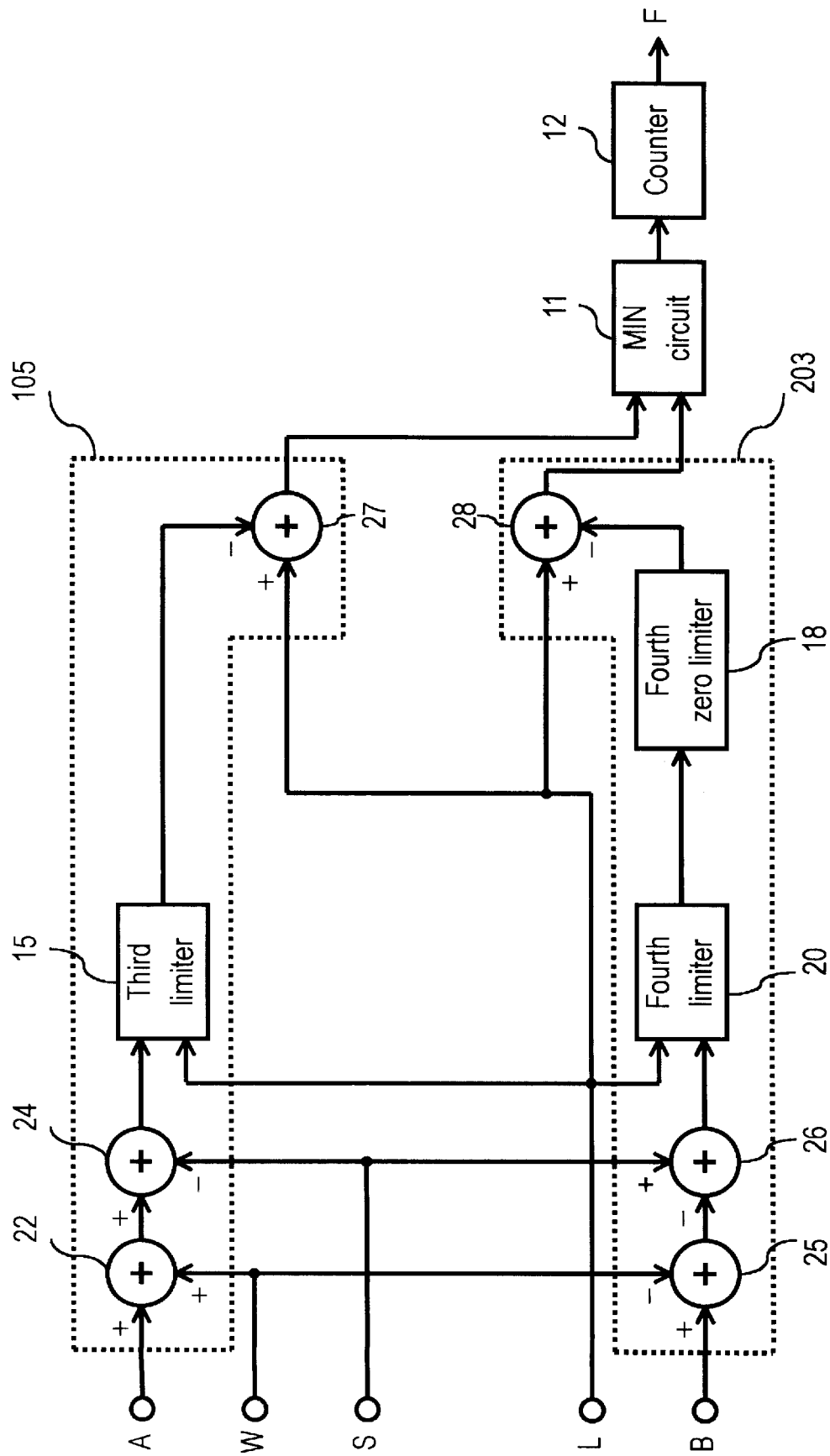
FIG. 6 is a block diagram of a histogram generator in accordance with a sixth exemplary embodiment of the present invention.
Figure 14A:
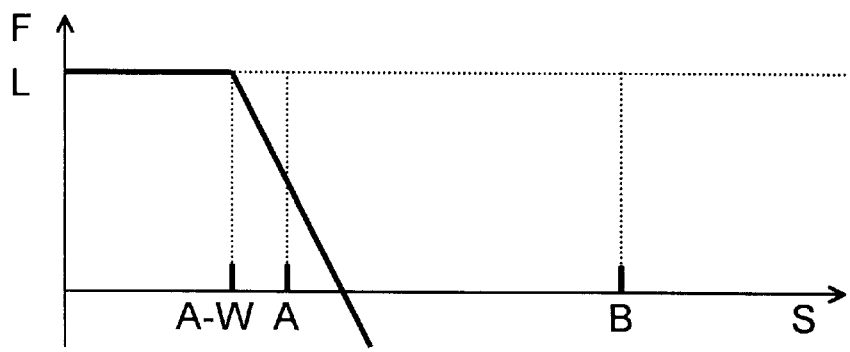
FIGS. 14A–D shows an order of creating a weighting function used for generating a histogram in the exemplary embodiment of the present invention.

FIG. 6 shows a configuration of a histogram generator for video signals in a sixth exemplary embodiment of the present invention. A difference with the fourth exemplary embodiment (FIG. 4) is that the third zero limiter 13 is not connected and the output of the third limiter 15 is directly connected to the subtractor 27. The output of the third limiter 15 is shown in FIG. 14A. The rest of the configurations and operations are the same as in the fourth exemplary embodiment, and thus their explanation is omitted.

Figure 14B:
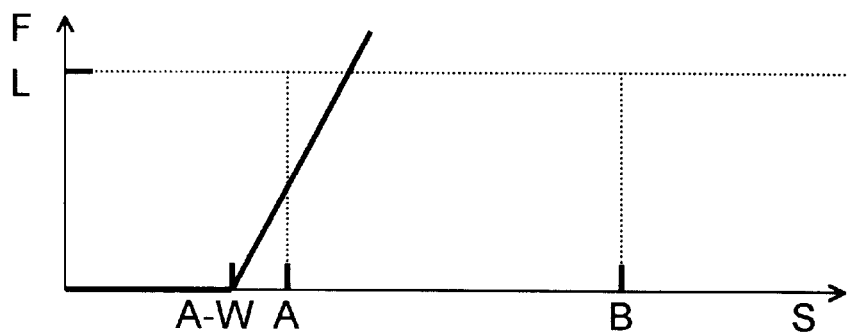

The output of the third limiter 15 is shown in FIG. 14A and the output produced by the operation of the first weighting circuit 105 is shown in FIG. 14B.

Figure 14C:
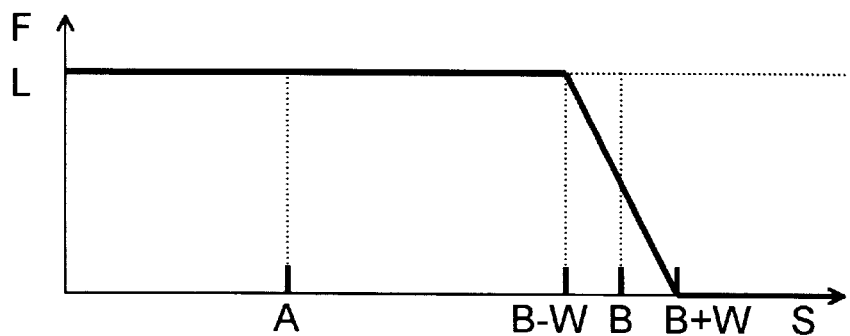

The output produced by the operation of the second weighting circuit 203 is shown in FIG. 14C. In the present exemplary embodiment L is equal to 2W.

Figure 14D:
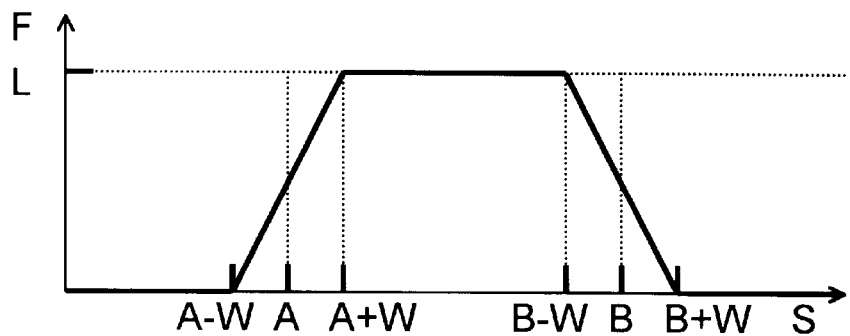

According to the operation of a minimum detector 11 and counter 12, a histogram based on value weighted by a trapezoid weighting function, shown in FIG. 14D, is generated.

It is possible, however, to combine any one of the weighing circuits associated with the lower threshold value A in the fifth and sixth exemplary embodiment with any one of the weighing circuits associated with the upper threshold value B in the first to the fourth exemplary embodiment.

Seventh Exemplary Embodiment

Figure 7:
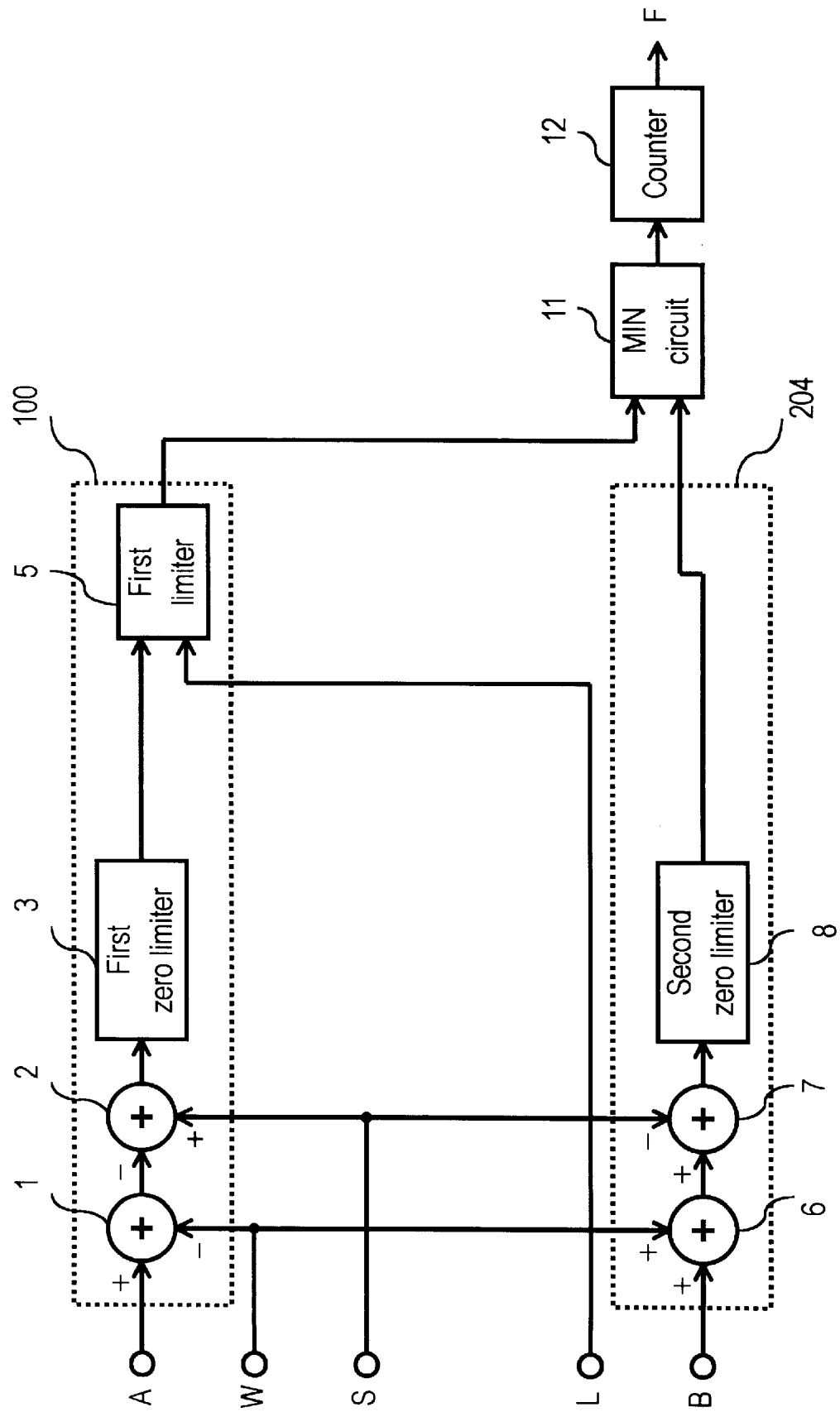
FIG. 7 is a block diagram of a histogram generator in accordance with a seventh exemplary embodiment of the present invention.

FIG. 7 shows a configuration of a histogram generator for video signals in a seventh exemplary embodiment of the present invention. A difference with the first exemplary embodiment (FIG. 1) is that the second limiter 10 is not connected and the output of the second zero limiter 8 is directly connected to the minimum detector 11. The rest of the configurations and operations are the same as in the first exemplary embodiment, and thus their explanation is omitted.

The output produced by the first weighting circuit 100 is shown in FIG. 11B and the output produced by the operation of the second weighting circuit 204 is shown in FIG. 11C. In the present exemplary embodiment L is equal to 2W.

According to the operation of a minimum detector 11 and counter 12, a histogram based on value weighted by a trapezoid weighting function, shown in FIG. 11E, is generated.

Eighth Exemplary Embodiment

Figure 8:
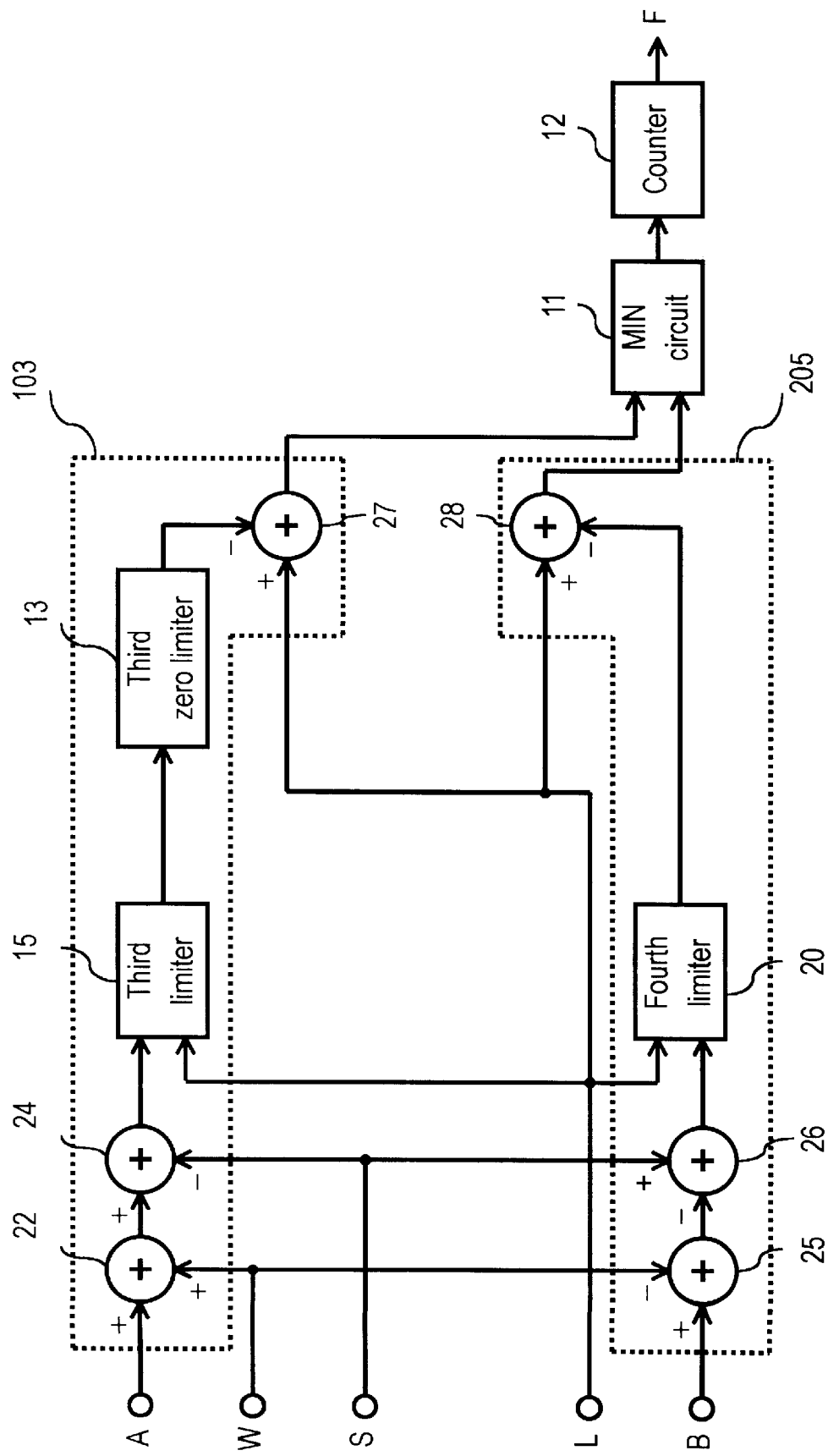
FIG. 8 is a block diagram of a histogram generator in accordance with a eighth exemplary embodiment of the present invention.

FIG. 8 shows a configuration of a histogram generator for video signals in a eighth exemplary embodiment of the present invention. A difference with the fourth exemplary embodiment (FIG. 4) is that the fourth zero limiter 18 is not connected and the output of the fourth limiter 20 is directly connected to the eighth subtractor 28. The rest of the configurations and operations are the same as in the fourth exemplary embodiment, and thus their explanation is omitted.

Figure 15A:
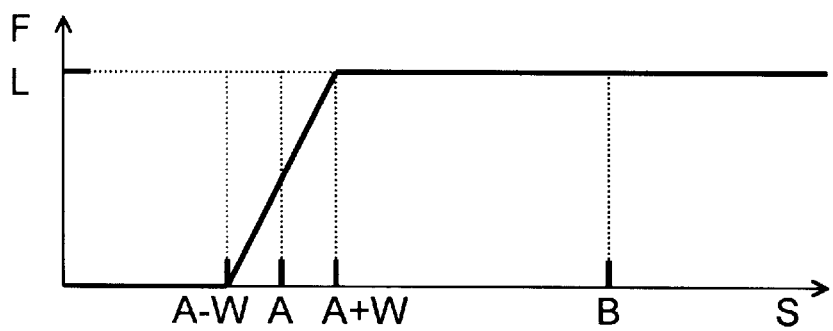
FIGS. 15A–C shows an order of creating a weighting function used for generating a histogram in the exemplary embodiment of the present invention.
Figure 15B:
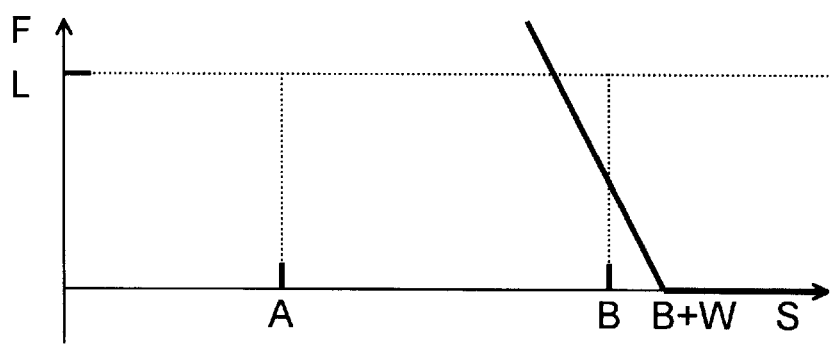

The output produced by the first weighting circuit 103 is shown in FIG. 15A and the output produced by the operation of the second weighting circuit 205 is shown in FIG. 15B. In the present exemplary embodiment L is equal to 2W.

Figure 15C:
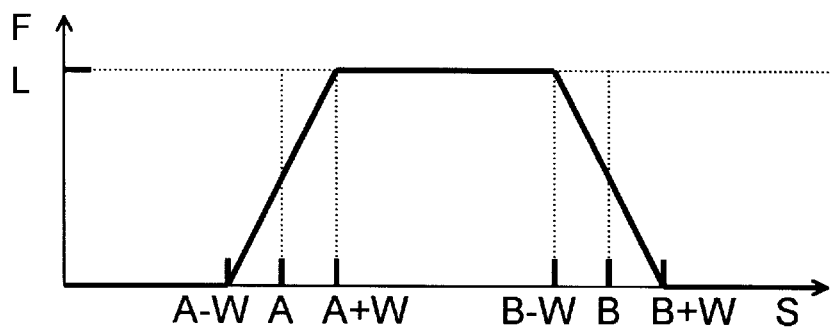

According to the operation of a minimum detector 11 and counter 12, a histogram based on values weighted by a trapezoid weighting function, shown in FIG. 15C, is realized.

It is possible, however, to combine any one of the weighing circuits associated with the upper threshold value B in the seventh and eighth exemplary embodiment with any one of the weighing circuits associated with the lower threshold value A in the first to the fourth exemplary embodiment.

Ninth Exemplary Embodiment

Figure 9:
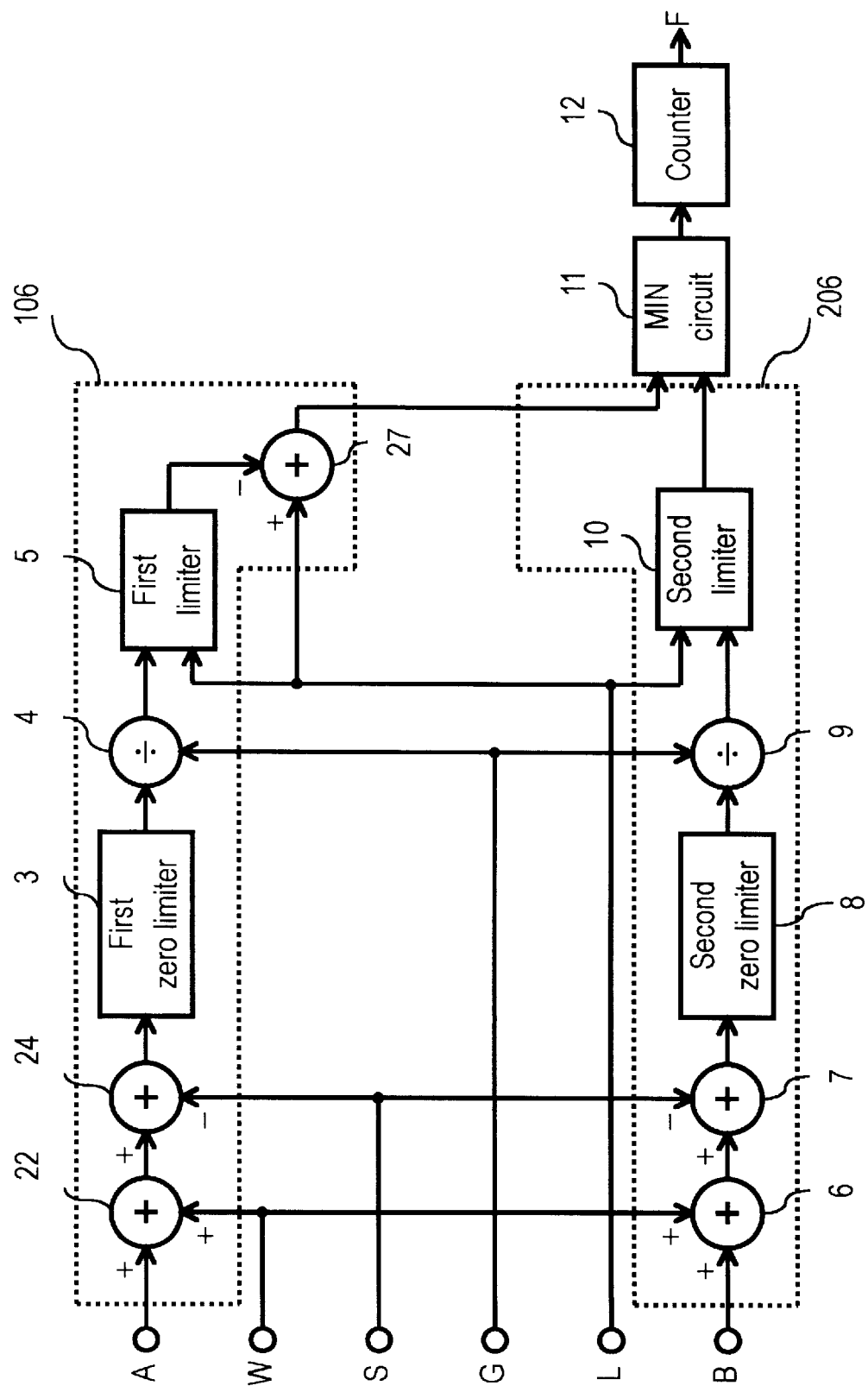
FIG. 9 is a block diagram of a histogram generator in accordance with a ninth exemplary embodiment of the present invention.

FIG. 9 shows a configuration of a histogram generator for video signals in a ninth exemplary embodiment of the present invention. A difference with in the first weighting circuit 106 the third exemplary embodiment (FIG. 3) is that a first divider 4 is connected between the first zero limiter 3 and the first limiter 5. A difference with in the second weighting circuit 206 the first exemplary embodiment (FIG. 1) is that a second divider 9 is connected between the second zero limiter 8 and the second limiter 10.

The configuration and operation of the first weighting circuit 106 is explained first.

The first divider 4 divides the output of the first zero limiter 3, (A+W−S) or 0 by a slope setting value G which is set externally; and outputs the divided value. In other words, the first divider 4 outputs (A+W−S)/G or 0 in response to the input video signal S.

The first limiter 5 receives the output of the first divider 4 and the limit level L, and outputs the result to the seventh subtractor 27. Here the value of the limit level L is different from that of the first to the eighth exemplary embodiments.

The slope setting value defines a weighting function near the threshold value A so that the weighted data is 0 if the value of the input data is (A−W), and the weighted data is L if the value of the input data is (A+W).

The configurations and operations of the second weighting circuit 206 are essentially the same as those described above, and thus their explanation is omitted. In the second weighting circuit 206 the slope setting value G is a value determining a weighting function near the threshold value B so that the weighted data is L if the value of the input data is (B−W), and the weighted data is 0 if the value of the input data is (B+W).

The dividers which divide by the slope setting value (G may be connected in a different position in the circuit than the position shown in FIG. 9; e.g. in an appropriate position upstream of the minimum detector 11. The symbol st in FIG. 16 denotes one step along the ordinate F and st=G*(L/(2*W)). Here (L/(2*W)) is a slope of the weighting function near the threshold.

A divider dividing by an externally set slope setting value G can be connected in the first to the eighth exemplary embodiments and to combination of the exemplary embodiments.

Tenth Exemplar Embodiment

Figure 10:
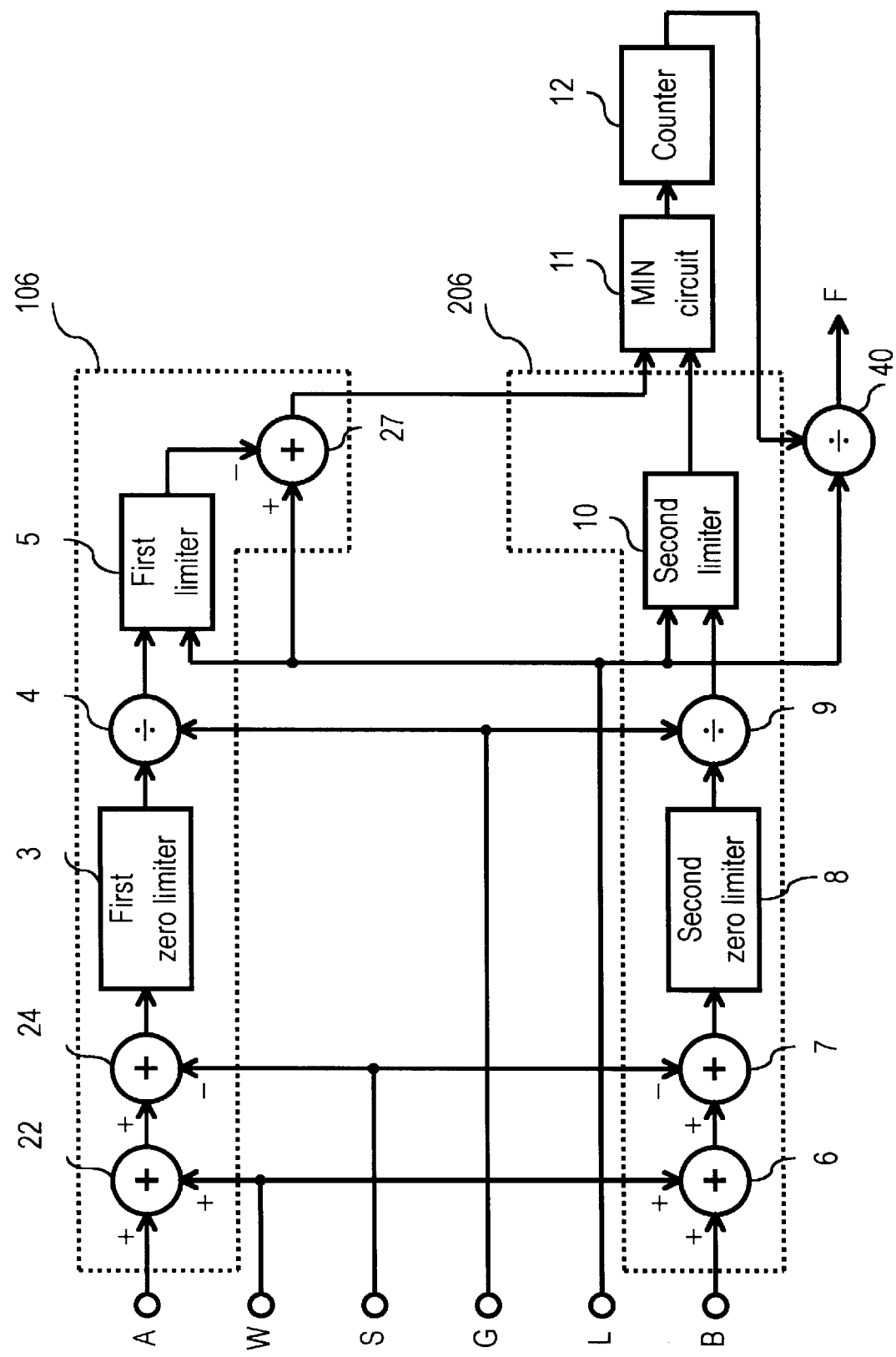
FIG. 10 is a block diagram of a histogram generator in accordance with a tenth exemplary embodiment of the present invention.

FIG. 10 shows a configuration of a histogram generator for video signals in a tenth exemplary embodiment of the present invention. A difference with the ninth exemplary embodiment (FIG. 9) is that a third divider 40 is connected. The third divider 40 divides the output from the counter 12 by a limit level L. The rest of the configurations and operations of the present embodiment are the same as in the ninth exemplary embodiment, and thus their explanation is omitted.

The third divider 40 divides the output of the counter 12 by the limit level L. This process normalizes the output of the MIN circuit 12. One aim of placing this third divider 40 downstream, instead of upstream, of the counter 12 is to minimize round-off errors generated by the division operation carried out by the third divider 40.

The tenth exemplary embodiment as configured above enables to create the stepped weighting function, for generating a histogram, shown by a solid line in FIG. 16. In this case, L indicated on the ordinate becomes 1.

According to the configuration and operation of the present invention, a histogram is generated using a trapezoidal weighting function as shown by a solid line in FIGS. 11E, 12E, 13E, 14D, 15C, and 16. In this exemplary embodiment, L indicated on the ordinate F is 1.

Utilizing this exemplary embodiment, a histogram may be generated while suppressing the effects of errors during operations related to normalization. Furthermore, the magnitude of the output data may be reduced by normalization, enabling reduction of in size of downstream circuits after the histogram generator of the present invention.

INDUSTRIAL APPLICABILITY

The present invention may be employed in video equipment for extracting the characteristic of video signals. The present invention enables improvement in stability of histogram generators by allocating a width to thresholds for creating the histogram and by weighting the data near the thresholds. Accordingly, the problem of incorrect generation of a histogram due to concentration of samples in an interval near the threshold, caused by the effects of noise, which may occur with other histogram generators can be solved.

The histogram generator of the present invention refers in detail to a weighting circuit associated with a lower threshold value that weighs input signals by an increasing linear or step function in the neighborhood of the lower threshold of each intervals and to a weighting circuit associated with an upper threshold value that weighs input signal by a decreasing linear or step function in a neighborhood of the upper threshold of each interval. The function type used, however, is not limited to a linear or a step function but can be an arbitrary function. The threshold width extending on both sides of a threshold does not have to be symmetrical about the threshold as explained in the present invention. The exemplary embodiments specifically refer to hardware like configurations of the histogram generator of the present invention. As is apparent to one of ordinary skill in the art the exemplary embodiment discussed above may be implemented in hardware, software, or a combination thereof. The present invention can also be applied to equipment other than television sets, including a variety of display devices such as PC monitors. The preferred embodiments described herein are therefore illustrative and not restrictive. The scope of the invention being indicated by the appended claims and all modifications which come within the true spirit of the claims are intended to be embraced therein.

What is claimed is:

1. A histogram generating apparatus for calculating a frequency of occurrence of at least one of a plurality of input values which correspond to an input data signal in at least one of a plurality of intervals that are defined by a plurality of threshold values, said histogram generating apparatus comprising:
   i) weighting means for outputting a plurality of output values which correspond to a weighted data signal based on said input data signal and said plurality of threshold values; and
   ii) counting means for totaling said output values which correspond to said weighted data signal
   wherein said weighted data signal is calculated based on a distance between each of said input values which correspond to said input data signal and at least one of said plurality of threshold values.

2. A histogram generating apparatus as defined in claim 1, wherein said counting means further comprises a means for generating a counting signal, and said histogram generating apparatus further comprises a divider for normalizing said counting signal of said counting means.

3. A generating apparatus as defined in claim 1, wherein said input data signal is a video data signal.

4. A histogram generating apparatus for calculating a frequency of occurrence of at least one of a plurality of input values which correspond to an input data signal in at least one of a plurality of intervals that are defined by a plurality of threshold values, said histogram generating apparatus comprising:
   i) first weighting means for weighting input data signals which are substantially equal to a first threshold value based on a weighting function, and producing a first output value;
   ii) second weighting means for weighting input data signals which are substantially equal to a second threshold value based on said weighting function, and producing a second output value;
   iii) minimum value detection means that outputs the smaller of said first output and said second output values; and
   counting means for totaling said first and second output values which correspond to said weighted data signal.

5. A histogram generating apparatus as defined in claim 4, wherein
   said weighting means outputs a constant value when one of said output values which correspond to said weighted data signal is substantially equal to the center of one of said plurality of intervals.

6. A histogram generating apparatus as defined in claim 4, wherein said first weighting means weighs said input data signal based on a predetermined slope setting value, and said second weighting means weighs said input data signal based on said predetermined slope setting value.

7. A histogram generating apparatus as defined in claim 5, wherein said first weighting means weighs said input data signal based on a predetermined slope setting value, and said second weighting means weighs said input data signal based on said predetermined slope setting value.

\* \* \* \* \*